United States Patent

Charras et al.

[11] Patent Number: 6,024,406
[45] Date of Patent: Feb. 15, 2000

[54] VEHICLE SEAT PROVIDED WITH A DEVICE FOR PROTECTING THE NECK IN THE EVENT OF IMPACT FROM BEHIND

[75] Inventors: Fabrice Charras, Paris; Bernard Courtois, Morigny; Yacine Ziar, Juvisy sur Orge, all of France

[73] Assignee: Bertrand Faure Equipements S.A., Boulogne, France

[21] Appl. No.: 09/108,280

[22] Filed: Jul. 1, 1998

[30] Foreign Application Priority Data

Jul. 3, 1997 [FR] France .................................. 97 08435

[51] Int. Cl.⁷ .............................. B60N 2/42; B60R 21/00
[52] U.S. Cl. .................................. 297/216.14; 297/216.1; 297/216.13; 297/472
[58] Field of Search ..................... 297/216.14, 216.13, 297/216.1, 472

[56] References Cited

U.S. PATENT DOCUMENTS

| | | |
|---|---|---|
| 1,529,248 | 3/1925 | Greene et al. |
| 3,578,376 | 5/1971 | Hasegawa et al. ............... 297/216 |
| 3,802,737 | 4/1974 | Mertens ............................ 297/216.1 |
| 3,998,291 | 12/1976 | Davis ................................. 297/216.1 |
| 5,219,202 | 6/1993 | Rink et al. ...................... 297/216.13 |
| 5,286,058 | 2/1994 | Wier .................................... 297/472 X |
| 5,366,269 | 11/1994 | Beauvais ......................... 297/216.19 |
| 5,378,043 | 1/1995 | Viano et al. ..................... 297/216.12 |
| 5,437,494 | 8/1995 | Beauvais ......................... 297/216.19 |
| 5,462,332 | 10/1995 | Payne et al. ...................... 297/216.1 |
| 5,509,716 | 4/1996 | Kolena et al. .................. 297/216.13 |
| 5,593,210 | 1/1997 | Schwarzbich .................... 297/361.1 |
| 5,645,316 | 7/1997 | Aufrere et al. ................. 297/216.13 |
| 5,676,421 | 10/1997 | Brodsky ........................... 297/216.13 |
| 5,738,407 | 4/1998 | Locke .......................... 297/216.13 X |
| 5,772,280 | 6/1998 | Massara ....................... 297/216.13 X |
| 5,795,019 | 8/1998 | Wieclawski .................... 297/216.12 |
| 5,927,804 | 7/1999 | Cuevas ......................... 297/216.13 X |

FOREIGN PATENT DOCUMENTS

| | | | |
|---|---|---|---|
| 843668 | 7/1939 | France ........................................ 5/3 |
| 2 590 529 | 5/1987 | France .......................... B60N 1/02 |
| 2 602 133 | 2/1988 | France ........................... A47C 7/46 |
| 2 754 221 | 4/1998 | France .......................... B60N 2/48 |
| 37 34 363 A1 | 4/1989 | Germany ........................ B60N 1/08 |
| WO 87/03256 | 6/1987 | WIPO ............................ B60N 1/06 |
| WO 97/10117 | 3/1997 | WIPO ............................ B60N 2/42 |

*Primary Examiner*—Peter M. Cuomo
*Assistant Examiner*—Rodney B. White
*Attorney, Agent, or Firm*—Marshall, O'Toole, Gerstein, Murray & Borun

[57] ABSTRACT

A motor vehicle seat has a strength-member for its back that includes an upper portion pivotally mounted on a lower portion and carrying a headrest, the two portions of the strength-member are connected together by a locking device which holds them together and which is dimensioned to give way when the back of a passenger bears against a thrust member of the upper portion of the strength-member in the event of an impact from behind, such that the upper portion of the seat-back strength-member and the upper region of the front face of the seat-back then pivot forwards together with the headrest, with this movement being braked by an energy absorber device.

16 Claims, 8 Drawing Sheets

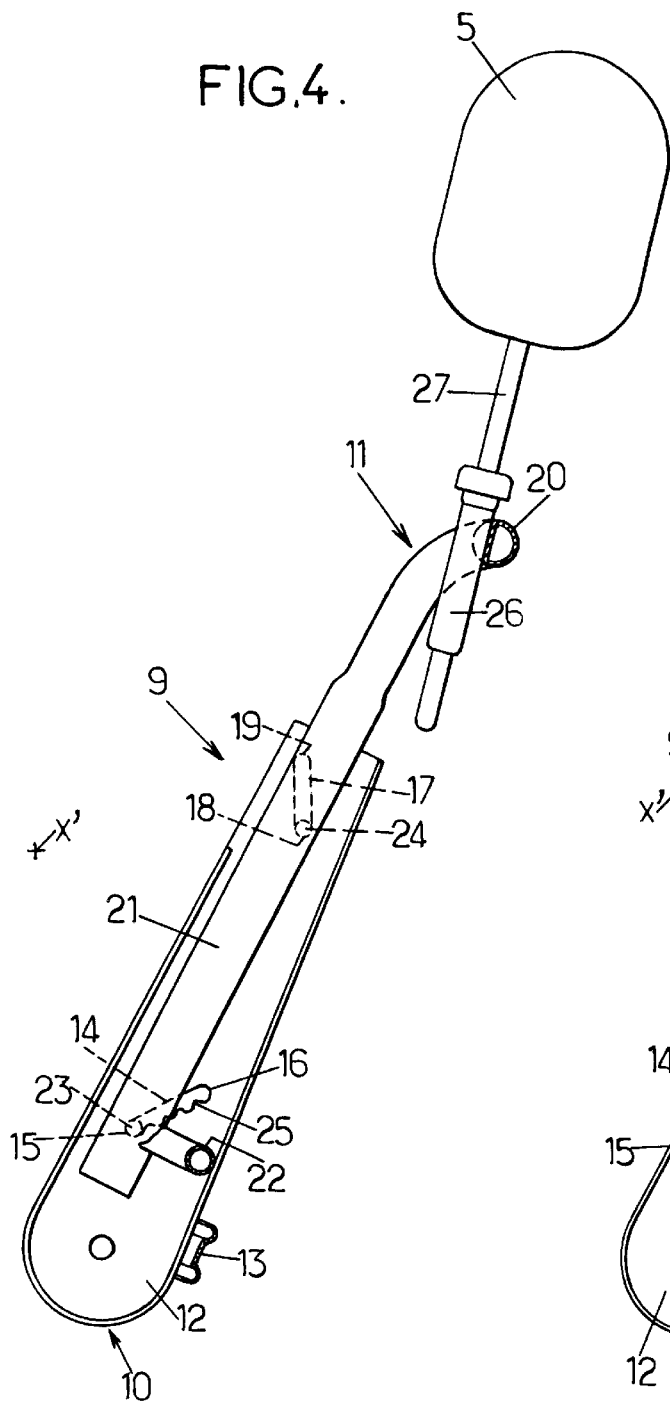
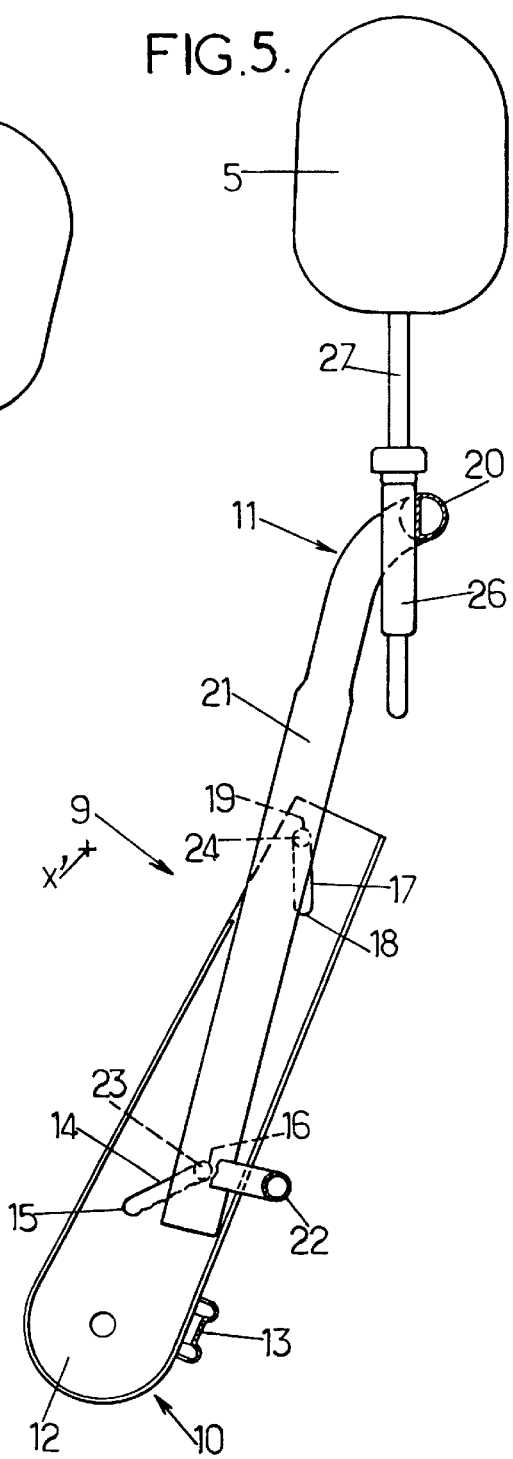

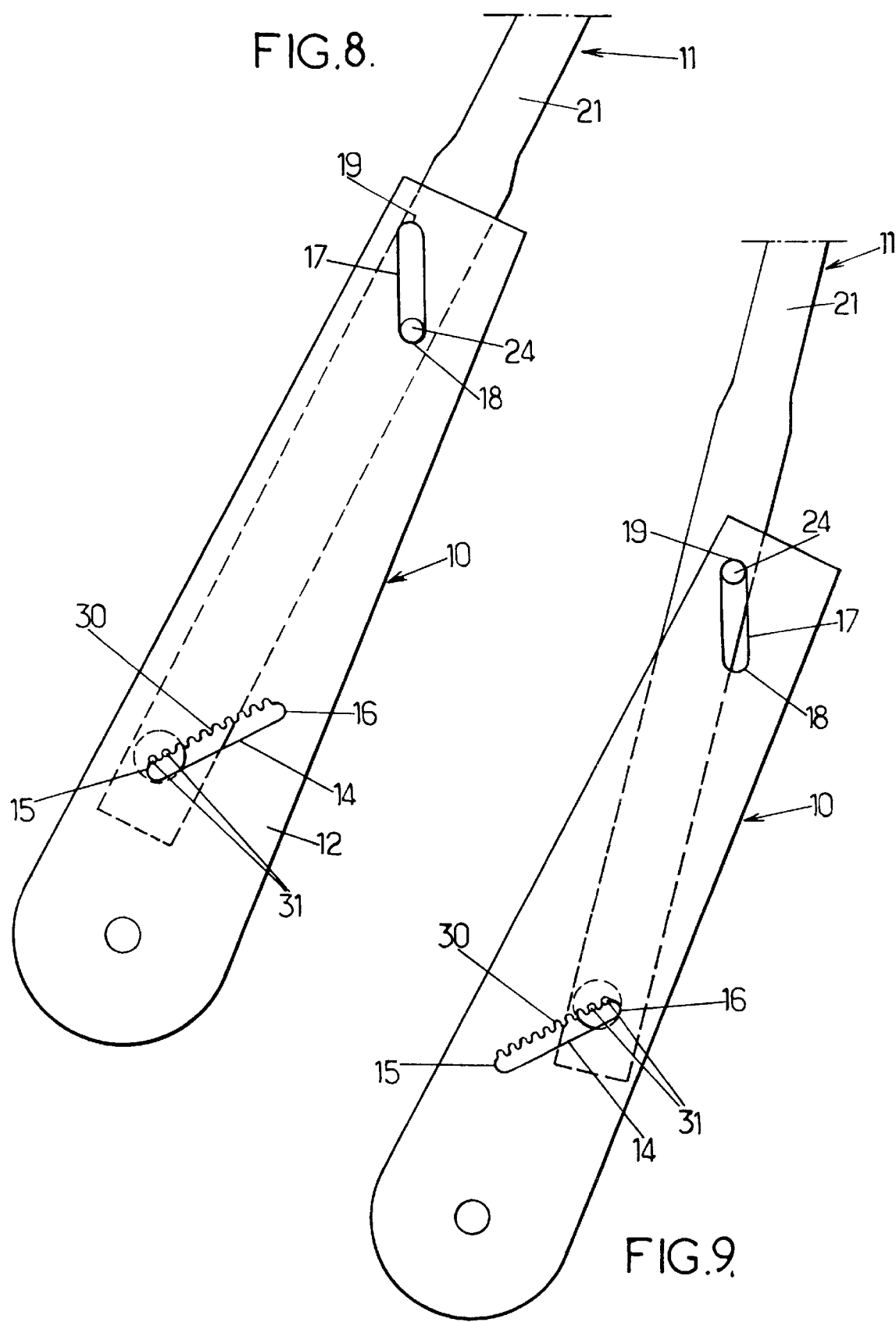

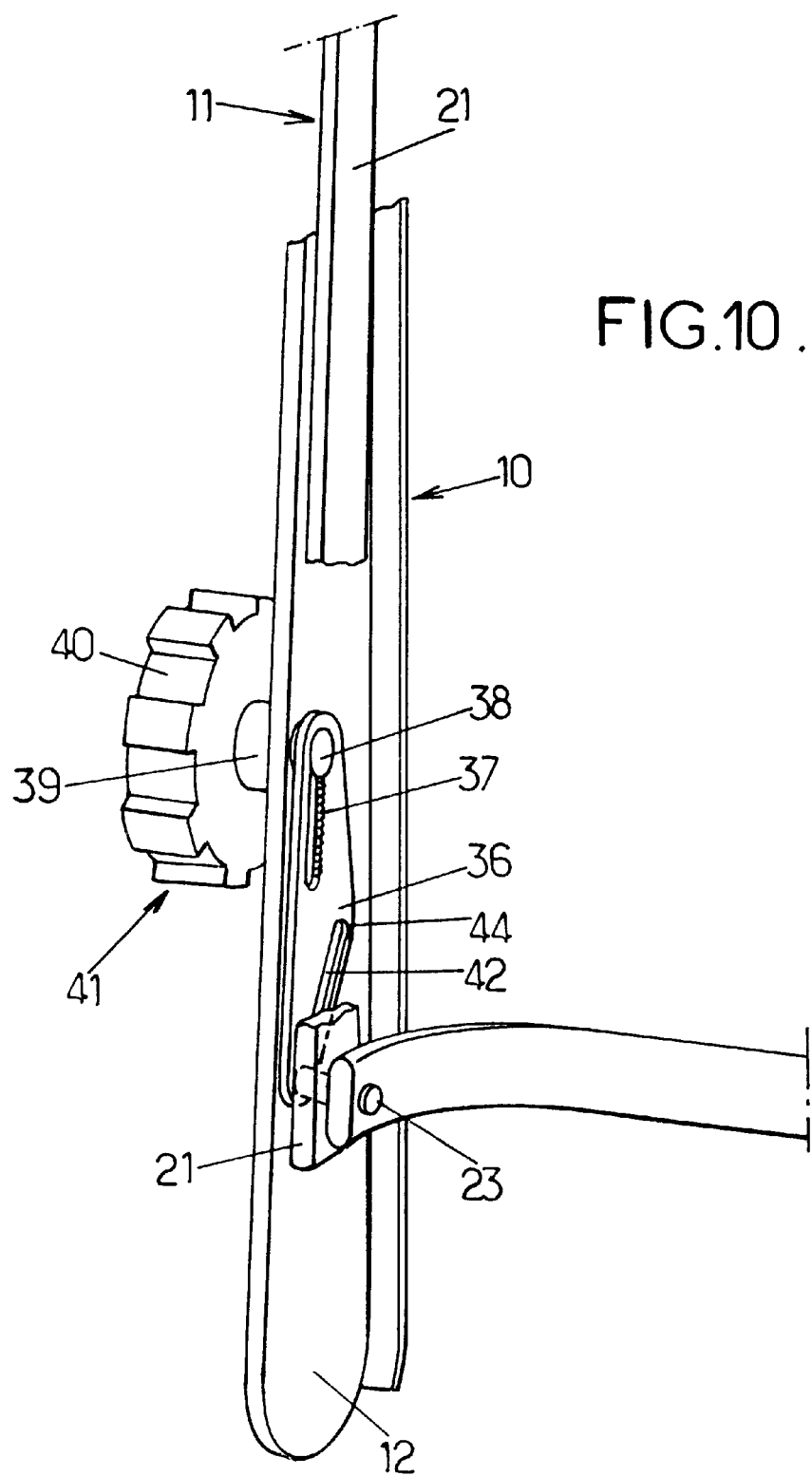

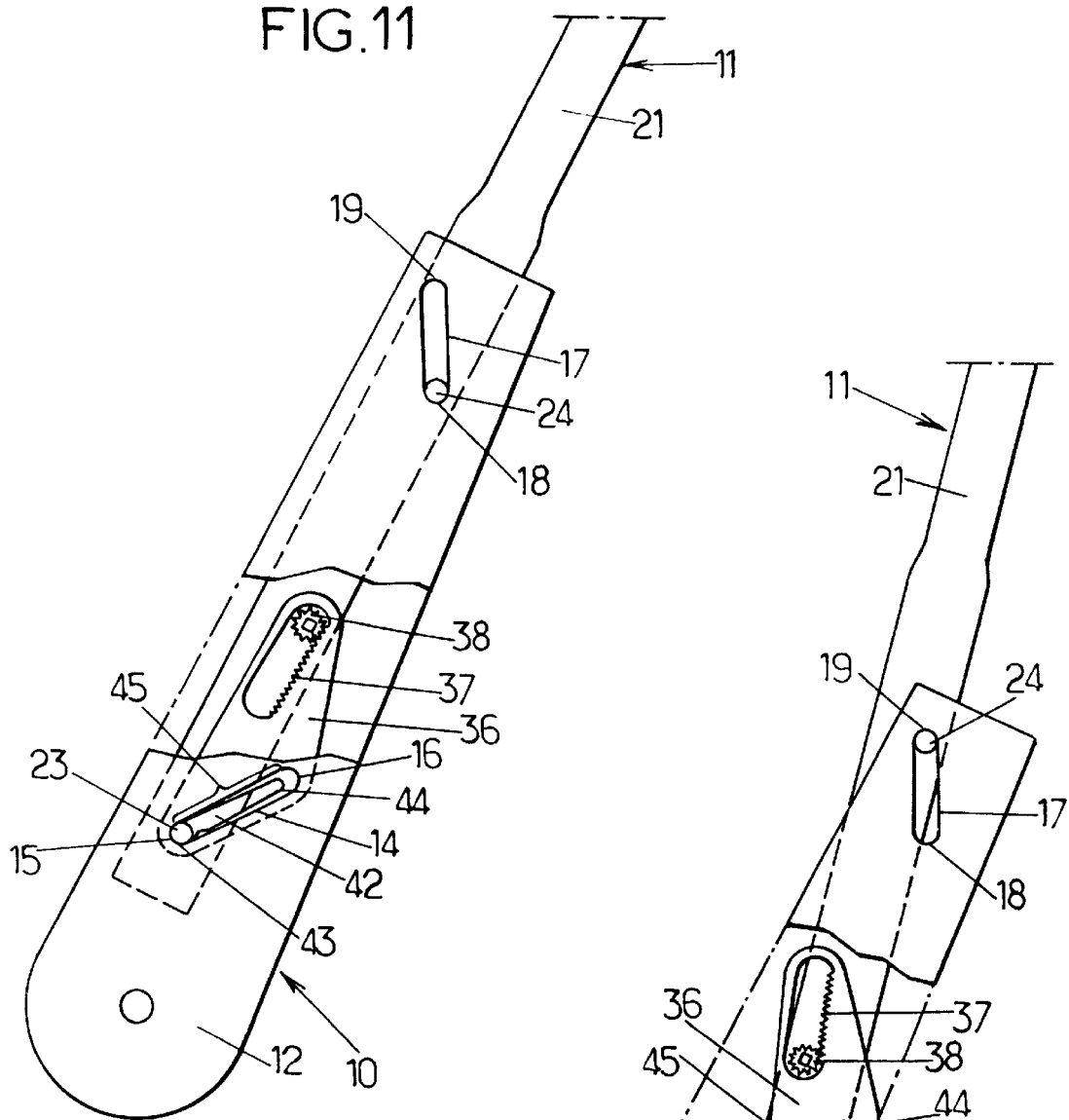

VEHICLE SEAT PROVIDED WITH A DEVICE FOR PROTECTING THE NECK IN THE EVENT OF IMPACT FROM BEHIND

FIELD OF THE INVENTION

The present invention relates to vehicle seats provided with devices for protecting the neck in the event of impact from behind.

More particularly, the invention relates to a vehicle seat comprising a seat-back surmounted by a headrest and provided with a strength-member supporting padding, said seat-back having a front face designed to bear against the back of a passenger, the strength-member of the seat-back being made up of two portions that are movable one relative to the other, namely firstly a lower portion and secondly an upper portion carrying the headrest, said upper portion being pivotally mounted on the lower portion to pivot about an axis of rotation between first and second angular positions in which it is respectively inclined as far rearwards and as far forwards as it will go relative to the lower portion, the front face of the seat-back itself having two superposed regions, namely a lower region and an upper region which are secured respectively to the lower portion and to the upper portion of the seat-back strength-member, the upper portion of the seat-back strength-member having a thrust member located in the seat-back below the level of the axis of rotation of said upper portion so that in the event of the vehicle being subjected to an impact from behind, the passenger's back bears rearwards against said thrust member as it is pushed into the padding of the seat-back, thereby urging the upper portion of the seat-back strength-member towards its second angular position, the upper and lower portions of the seat-back strength-member being interconnected via a retaining device which normally prevents involuntary pivoting of the upper portion, said retaining device being dimensioned to give way when the upper portion of the seat-back is not in its second angular position and said thrust member is subjected to a rearwardly-directed force in excess of a predetermined value, in the event of an impact from behind, and the headrest is mounted on the upper portion of the seat-back so as to be subjected to the same movement as said upper portion in the event of an impact from behind.

Thus, in the event of the vehicle being subjected to impact from behind, the upper portion of the seat-back pivots forwards together with the headrest, such that:

firstly the headrest comes closer to the nape of the passenger's neck, thereby retaining it more effectively; and secondly the rearward inclination of the upper portion of the seat-back is reduced, thereby reducing any tendency for the passenger in the seat to be projected upwards by a ramp effect, thus preventing the nape of the passenger's neck taking up a position above the headrest.

This reduces the risk of injury to the passenger.

BACKGROUND OF THE INVENTION

Document WO-A-97/10117 describes an example of a vehicle seat of the above-mentioned type.

The seat presented in that document nevertheless suffers from the drawback that when the upper portion of the seat-back reaches its second angular position, the pivoting of said upper portion is stopped suddenly, thereby running the risk of subjecting the seat passenger to an impact.

In an attempt to mitigate that drawback, the above-mentioned document provides that after the upper portion of the seat-back has pivoted forwards, the seat-back as a whole pivots rearwards while being retained by a spring. However that disposition further complicates implementation of the seat and, in addition, rearward pivoting of the entire seat-back runs the risk of injuring passengers situated behind the seat-back, or even of injuring the user of the seat if hard and bulky objects happen to be located behind the seat-back.

OBJECTS AND SUMMARY OF THE INVENTION

A particular object of the present invention is to mitigate those drawbacks.

To this end, according to the invention, a seat of the kind in question essentially further includes energy absorption means for braking the movement of the upper portion of the seat-back strength-member throughout its angular stroke, while said upper portion is moving into its second angular position, in the event of an impact from behind.

In preferred embodiments of the invention, use may optionally be had of one or more of the following dispositions:

- the upper portion of the seat-back strength-member is mounted on the lower portion to move upwards at the same time as it pivots forward;
- the upper portion of the seat-back strength is in the form of a frame including a horizontal lower cross-member constituting said thrust member;
- the locking device comprises the energy absorption means;
- the locking device holds the upper portion of the seat-back strength-member in its first angular position relative to the lower portion of said strength-member in the absence of an impact from behind;
- the upper portion of the seat-back strength-member is pivotally mounted on the lower portion of said strength-member by means of pivots sliding in slideways, at least one of said slideways extending longitudinally between first and second ends of a shape that is adapted normally to hold the corresponding pivot at its first end and in the event of an impact from behind to deform to allow said pivot to move from the first end to the second end of the slideway while the slideway is being subjected to progressive plastic deformation throughout the stroke of the pivot between the first and second ends of the slideway;
- the slideway is formed by a slot having an enlarged portion at its first end and a narrower portion extending from said enlarged portion to the second end of said slideway, said narrower portion being adapted to deform plastically while allowing the corresponding pivot to be displaced in the event of an impact from behind;
- the retaining device is a non-reversible control mechanism driven by a control member, said control mechanism being adapted to move the upper portion of the seat-back strength-member between its first and second angular positions as a function of the actuation of the control member, and to lock said upper portion of the seat-back strength-member when the control member is not being actuated;
- the control mechanism comprises at least one rotary drive member meshing with a set of teeth, one of said drive member and said set of teeth being connected to the upper portion of the seat-back strength-member, and the other one thereof being connected to the lower portion of said strength-member so that displacement of the drive member against the set of teeth causes the inclination of the upper portion of the seat-back strength-member to be varied, the set of teeth being adapted to deform progressively and plastically to enable the drive member to move along said set of teeth without rotating in the event of an impact from behind, said set of teeth thus constituting the energy absorption means;

the upper portion of the seat-back strength-member is pivotally mounted on the lower portion of said strength-member via pivots slidably received in the slideways, at least one of the pivots including said drive member, and said set of teeth being formed in the corresponding slideway;

the upper portion of the seat-back strength-member is pivotally mounted on the lower portion of said strength-member by means of pivots slidably received in the slideways, at least one of the pivots being secured to a link, one of said pivot and the corresponding slideway being secured to the upper portion of the seat-back strength-member, and the other one thereof being secured to the lower portion of said strength-member, the link being displaceable by means of said non-reversible control mechanism relative to the portion of the seat-back strength-member which includes said slideway so that displacement of the link entrains corresponding displacement of the pivots in their slideways and the link is plastically deformable in the event of an impact from behind, thereby constituting the energy absorption means;

the control mechanism comprises a gearwheel mounted to rotate on the seat-back strength-member portion which includes the slideway corresponding to the link, said gearwheel meshing with a rack formed in the link;

the link is in the form of a piece of sheet metal which is provided with a slot extending between first and second ends, said slot having an enlarged portion at its first end and a narrower portion extending from said enlarged portion to the second end of the slot, the pivot which is secured to the link being engaged with substantially no play in said enlarged portion, said slot being disposed substantially in correspondence with the slideway in which said pivot slides, at least when the upper portion of the seat-back strength-member is in its first angular position, and the slot is adapted to deform plastically and progressively while allowing said pivot to move towards the second end of the slot when the upper portion of the seat-back strength-member is moved towards its second angular position in the event of an impact from behind;

the non-reversible control mechanism is carried by the lower portion of the seat-back strength-member and drives a gearwheel which meshes with a toothed link pivotally mounted on the lower portion of the seat-back and hinged to the upper portion of the seat-back, the non-reversible control mechanism being adapted to allow the gearwheel to rotate while braking it in the absence of action being taken on the control member, whenever said gearwheel is subjected to a rotary torque in excess of a predetermined value in the event of an impact from behind;

the non-reversible control mechanism entrains a gearwheel which is mounted on the lower portion of the seat-back strength-member and which entrains a toothed cam, itself pivotally mounted on said lower portion, said cam having a bearing edge in contact with an element secured to the upper portion of the seat-back strength-member so as to allow displacement of said upper portion solely towards its second angular position, and said upper portion of the seat-back strength-member is urged resiliently towards its first angular position;

the element secured to the upper portion of the seat-back strength-member connects said upper portion to a link which is pivotally mounted on the lower portion of the seat-back strength-member; and the upper portion of the seat-back strength-member is connected to the lower portion of said strength-member by tearable pieces of metal sheet of a dimension suitable for withstanding the forces applied thereto while the upper portion of the seat-back strength-member is moving towards its second angular position in the event of an impact from behind, and thereafter to tear in part while continuing to absorb a fraction of the energy of the impact.

BRIEF DESCRIPTION OF THE DRAWINGS

Other characteristics and advantages of the invention appear from the following description of various embodiments given as non-limiting examples and with reference to the accompanying drawings.

In the drawings:

FIGS. 4 and 5 are vertical section views through the seat-back strength-member of FIG. 2, respectively in a normal position of use and after an impact from behind;

FIGS. 8 and 9 are fragmentary diagrammatic views of the FIG. 7 seat-back strength-member respectively showing the upper portion of the strength-member in its two extreme angular positions, respectively;

FIG. 10 is a fragmentary perspective view of the seat-back strength-member belonging to the seat of FIG. 1, in a third embodiment of the invention;

FIGS. 11 and 12 are fragmentary diagrammatic views of the FIG. 10 strength-member showing the upper portion of said strength-member in its two extreme angular positions, respectively;

MORE DETAILED DESCRIPTION

In the various figures, the same references are used to designate elements that are identical or similar.

Figure 1:
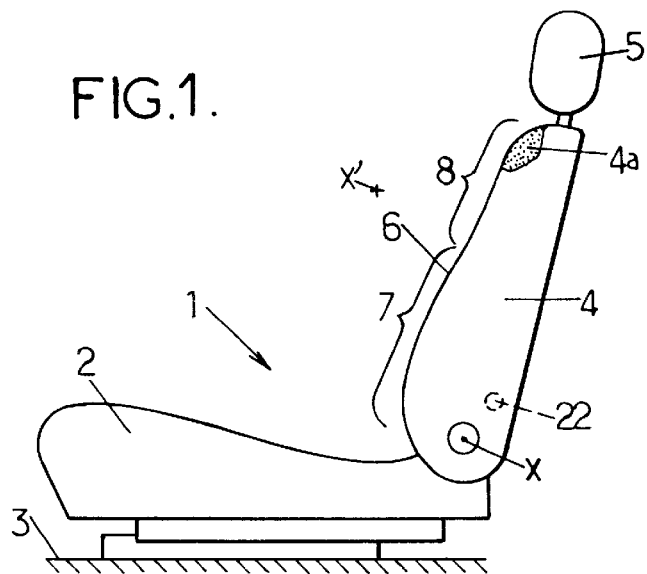
FIG. 1 is a diagrammatic view of a seat of the invention.

FIG. 1 shows a vehicle seat 1, in particular a front seat of a motor vehicle, comprising firstly a seat proper 2 mounted on a floor 3 of the vehicle, and secondly a seat-back 4 pivotally mounted on the seat proper 2 about a transverse horizontal axis X.

The seat-back 4 has a metal strength-member carrying padding 4a and also carrying a headrest 5. The seat-back 4 also has a front face 6 designed to support the back of a passenger, said front face itself being subdivided into a lower region 7 and an upper region 8 whose inclination can be varied in the event of the vehicle being subjected to an impact from behind, as explained below.

Figure 2:
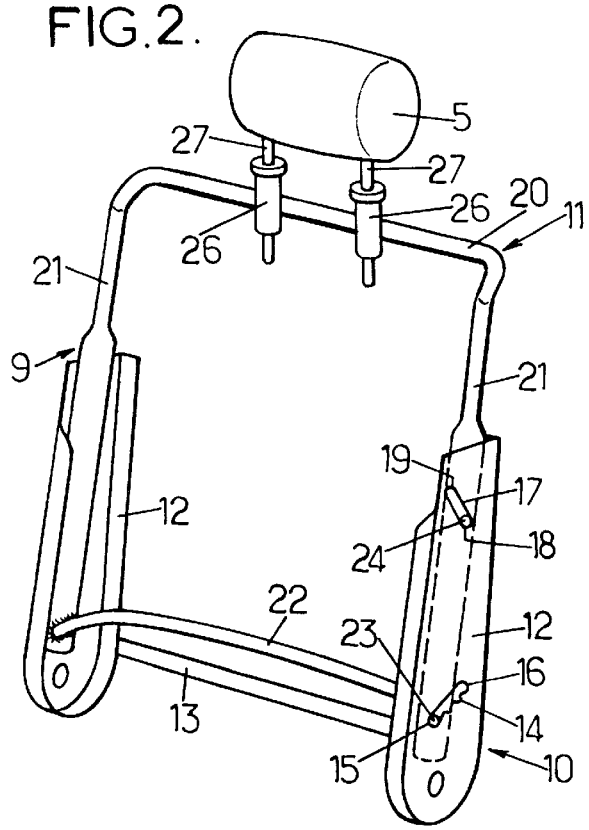
FIG. 2 is a perspective view of the strength-member belonging to the back of the FIG. 1 seat, in a first embodiment of the invention.

To this end, as shown in FIG. 2 for a first embodiment of the invention, the strength-member 9 of the seat-back is made up of two portions that can be moved relative to each other, specifically a lower portion 10 pivotally mounted to the seat proper about the transverse axis X and secured to the lower region 7 of the front face of the seat-back, and secondly an upper portion 11 pivotally mounted on the lower portion 10 about a virtual pivot axis X' (FIG. 1) and which is secured to the upper region 8 of the front face of the seat-back.

In the particular example considered here, the lower portion 10 of the seat-back strength-member comprises two vertical side plates 12 pivotally mounted to the seat proper 2 about the transverse axis X and interconnected by a lower cross-member 13.

The side plates 12 have respective lower slots 14 disposed in corresponding positions on either side of the seat-back, and each sloping upwards and rearwards from a respective first end 15 to a respective second end 16.

In addition, the two side plates 12 also have respective upper slots 17 disposed in register with each other on opposite sides of the seat-back, and each extending upwards and forwards from a first end 18 to a second end 19.

The top portion 11 of the seat-back strength-member also has a metal section member, e.g. a tubular member, which is bent to become generally U-shaped, having a top cross-member 20 and two side branches 21 which are interconnected near to their bottom ends by a rigid cross-member 22 that curves slightly rearwards. The cross-member 22 constitutes a thrust member.

The cross-member 22 is disposed inside the seat-back 4, slightly higher than the seat proper 2 but below the virtual pivot axis X' for the upper portion 11 of the seat-back strength-member (see FIG. 1).

In addition, each of the side branches 21 belonging to the upper portion 11 of the strength-member comprises:

a lower pivot 23 engaged in the corresponding lower slot 14 and normally located at the first end 15 of said slot; and an upper pivot 24 which is engaged in the corresponding slot 17 and which is normally at the first end 18 of said slot.

Finally, the strength-member 9 of the seat-back also includes a locking device which normally holds the upper portion 11 of said strength-member in its above-described position, referred to as its "first" angular position.

Figure 3:
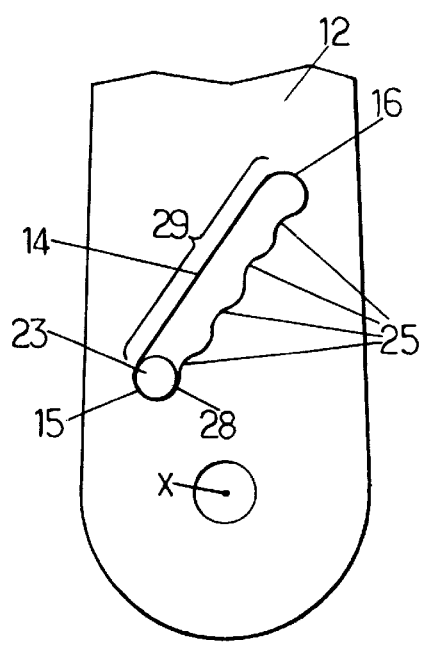
FIG. 3 is a detail view of FIG. 2.

Advantageously, as shown in FIG. 3, the locking device can be constituted by ridges 25 formed in at least one of the slots 14, 17, e.g. in both lower slots 14, and serving to co-operate with the corresponding pivots 23.

The ridges 25, which define a narrower portion 29 of each slot 14, normally serve to hold the pivots 23 in enlarged portions 28 formed at the first ends 15 of the slots 14 (FIG. 4).

However, when the vehicle is subjected to impact from behind, the back of the passenger in the seat is pressed into the padding 4a of the seat-back and thus bears backwards against the cross-member 22.

If the impact from behind is violent, the force exerted in this way by the passenger on the cross-member 22 is sufficient to cause the pivots 23 to penetrate into the narrower portions 29 of the slots 14 successively flattening the ridges 25 as said pivots moves towards the second ends 16 of the slots 14. Simultaneously, the upper pivots 24 move towards the second ends 19 of the slots 17.

It will be observed that the cross-member 13 of the lower portion 10 of the seat-back strength-member is positioned quite low so as to avoid interfering with the movement of the upper portion 11.

By means of these dispositions, part of the energy of an impact is dissipated by crushing the ridges 25.

In addition, the upper portion 11 of the seat-back strength-member pivots forwards, while moving upwards (in the example shown, the axis of rotation X' of the upper portion 11 moves upwards during this movement), taking with it the upper region 8 of the front face of the seat-back and the headrest 5. By way of example, the headrest 5 may move through about 5 cm to 10 cm in an upward direction and 5 cm to 10 cm in a forward direction during this movement.

Thus, firstly the headrest ends up higher and closer to the nape of the passenger's neck, thereby restraining the neck better during impact, and secondly the passenger of the seat has a smaller tendency to be moved upwards by the ramp effect, insofar as the upper region 8 of the front face of the seat-back slopes backwards to a smaller extent.

This reduces the risk of the passenger of the seat being injured at the nape of the neck.

It will be observed that the headrest 5 may be of a standard type, as can the connection between said headrest 5 and the upper portion 11 of the seat-back strength-member.

In the example under consideration, this connection is made by means of two sockets 26 secured to the top cross-member 20 and slidably receiving rods 27 secured to the headrest for the purpose of adjusting the height of said headrest. Nevertheless, this connection between the headrest 5 and the upper portion 11 of the seat-back strength-member could be of any other conventional type, and in particular it could include a mechanism for adjusting the inclination of the headrest 5.

Figure 6:
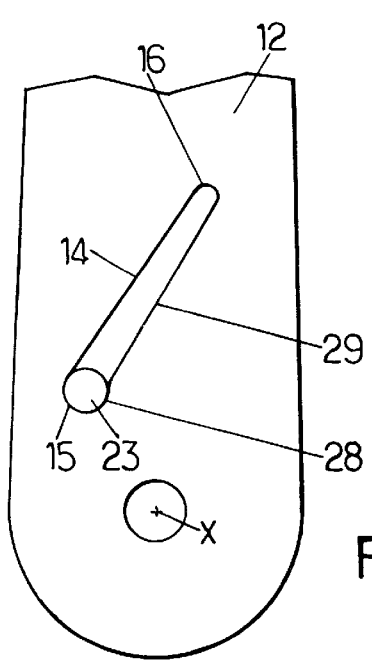
FIG. 6 is a view similar to FIG. 3 in a variant of the first embodiment of the invention.

In a variant of the first embodiment of the invention, as shown in FIG. 6, the slots 14 and 17 do not have ridges 25. Under such circumstances, each of the lower slots 14 (or at least both of one kind of slot 14, 17) has a respective enlarged portion 28 in the vicinity of its first end 15, and a continuous narrower portion 29 that is narrower than the pivots 23, going from said enlarged portion 28 to the second end 16 of each of said slots.

In this way, the pivots 23 are received with substantially no play in the corresponding portions 28 so long as the seat-back is in its normal position of use, and the pivots 23 subsequently move towards the second ends 16 of the slots 14 in the event of an impact from behind, progressively and plastically deforming the narrower portions 29 of the slots 14, thereby absorbing a portion of the energy of the impact.

Advantageously, the narrower portions 29 of the slots 14 are slightly wedge-shaped, tapering towards the second ends 16 of said slots 14.

In the second and third embodiments of the invention as shown in FIGS. 7 to 12, the general structure of the seat and of the strength-member of its back is similar to that described above, such that the description below concentrates only on the differences of these second and third embodiments of the invention compared with the first embodiment.

Figure 7:
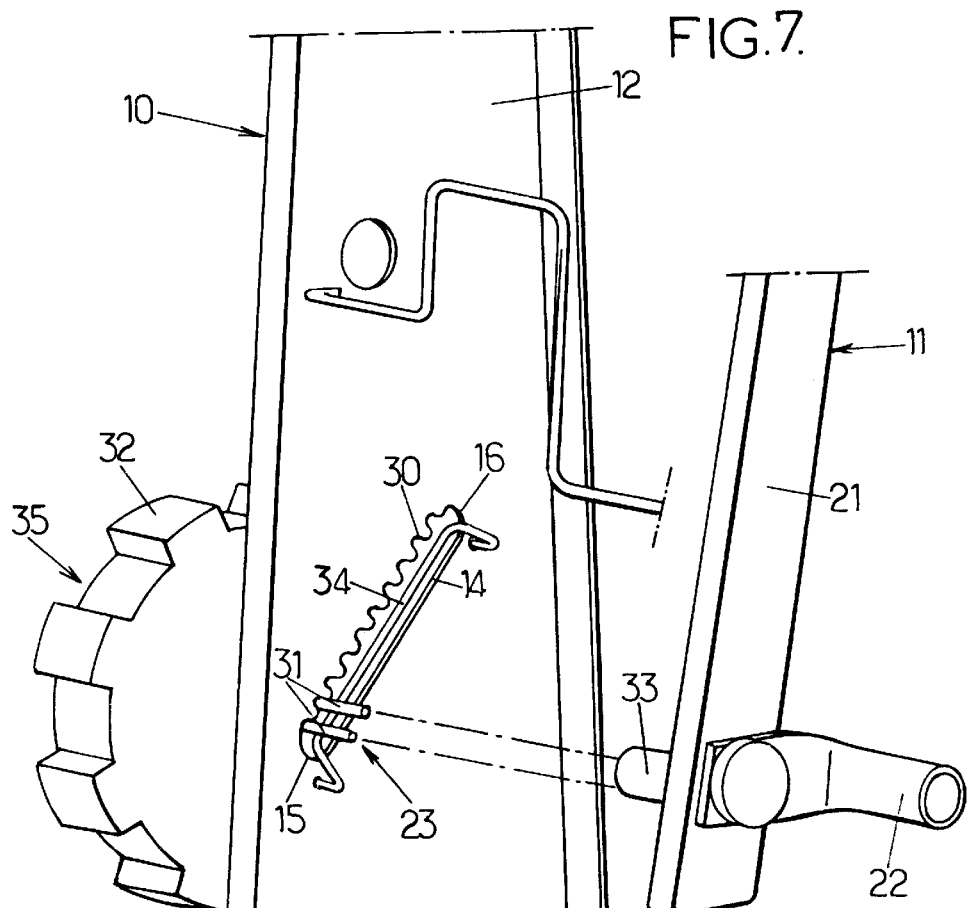
FIG. 7 is an exploded perspective view showing a portion of the seat-back strength-member belonging to the seat of FIG. 1, in a second embodiment of the invention.

In the second embodiment of the invention, as shown in FIGS. 7 to 9, the lower slots 14 do not have an enlarged portion 28 and a narrower portion 29, but instead one of the lower slots 14 is provided with a set of teeth 30 forming one of the longitudinal edges of said slot.

In addition, the pivot 23 which moves along the slot 14 includes a rotary member having two fingers 31 which extend parallel to the axes X and X' and which can be rotated by a knob 32.

These two fingers 31 penetrate into a socket 33 secured to one of the side branches 21 and to the cross-member 22 of the upper portion 11 of the seat-back strength-member, so that any displacement of the fingers 31 along the slot 14 gives rise to corresponding angular displacement of the upper portion 11 of the seat-back strength-member.

In addition, a resilient metal wire 34 mounted on the side plate 12 which includes the toothed slot 14, bears continuously against the socket 33 so as to urge the fingers 31 into the set of teeth 30.

The set of teeth 30, the fingers 31, the knob 32, the socket 33, and the spring 34 together constitute a control mechanism 35 which, by turning the knob 32, enables the inclination of the upper portion 11 of the seat-back strength-member to be adjusted relative to the lower portion 10.

This inclination can thus be adjusted between:

firstly the first above-mentioned angular position of the strength-member 11, when the fingers 31 are to be found at the first end 15 of the corresponding slot 14 (FIG. 8); and secondly the second above-mentioned angular position of the strength-member 11, when the fingers 31 are at the second end 16 of the corresponding slot 14 (FIG. 9).

This adjustment serves to improve the comfort of the seat 1.

The control mechanism 35 is not reversible, i.e. it normally remains locked unless the knob 32 is actuated.

Nevertheless, if the vehicle is subjected to a sufficiently large impact from behind while the upper portion 11 of the seat-back strength-member is not in its second angular position, then the set of teeth 30 is progressively crushed so as to allow the fingers 31 to move towards the end 16 of the corresponding groove 14, thereby enabling the upper portion 11 of the seat-back strength-member to move to its second angular position, as shown in FIG. 9.

During this movement, the progressive plastic deformation of the set of teeth 30 absorbs a fraction of the energy of the impact, and the upper region 8 of the front face of the seat-back moves forwards and upwards together with the headrest 5, as explained above.

If an impact from behind takes place when the upper portion 11 of the seat-back strength-member has already been set by the user of the seat into its second angular position as shown in FIG. 9, then this upper portion remains in said second angular position, and this is not troublesome since the seat-back is then already in its optimum position for protecting the passenger.

In the third embodiment of the invention as shown in FIGS. 10 to 12, all of the slots 14 and 17 are free from any ridges, and the pivot 23 in one of the slots 14 is secured to a crank-like link 36 provided with a rack 37 meshing with a gearwheel 38.

The gearwheel 38 is pivotally mounted on the corresponding side plate 12, and it is coupled to a non-reversible transmission 39 of conventional type, said transmission itself being controlled by a rotary knob 40.

The link 36, its rack 37, the gearwheel 38, the transmission 39, and the knob 40 thus constitute a non-reversible drive mechanism 41 serving to vary the distance between the gearwheel 38 and the pivot 23 by acting on the knob 40.

It is thus possible to move the pivot 23 along the corresponding slots 14 between:

firstly the first end 15 of said slot 14, corresponding to the above-mentioned first angular position for the upper portion 11 of the seat-back strength-member (FIG. 11);

secondly the second end 16 of the slot 14, corresponding to the second above-mentioned angular position for the upper portion 11 of the seat-back strength-member (FIG. 12).

In contrast, the gearwheel 38 remains locked unless the knob 40 is actuated, even if a force is exerted on the upper portion 11 of the seat-back.

Nevertheless, in the event of the vehicle being subjected to a sufficiently large impact from behind, the link 36 is adapted to deform plastically and progressively, enabling the upper portion 11 of the seat-back to pivot into its second angular position unless said upper portion was already adjusted to be in said second angular position, as explained above with reference to the second embodiments.

In order to facilitate this plastic deformation, the link 36 is advantageously in the form of a piece of sheet metal provided with a wedge-shaped slot 42 extending from a first end 43 forming an enlarged portion in which the pivot 23 is received without play, and a narrower second end 44, with the portion 45 of the slot 42 situated between the pivot 23 and the second end 44 being narrow enough to prevent, under normal circumstances, the pivot 23 moving thereal-ong.

The slot 42 is preferably disposed substantially in register with the adjacent slot 14 when the upper portion 11 of the seat-back strength-member is in its first angular position (FIG. 11).

In this way, in the event of the vehicle being subjected to impact from behind, the slot 43 deforms plastically as the pivot 23 moves, thereby absorbing a portion of the energy of the impact.

Figure 13:
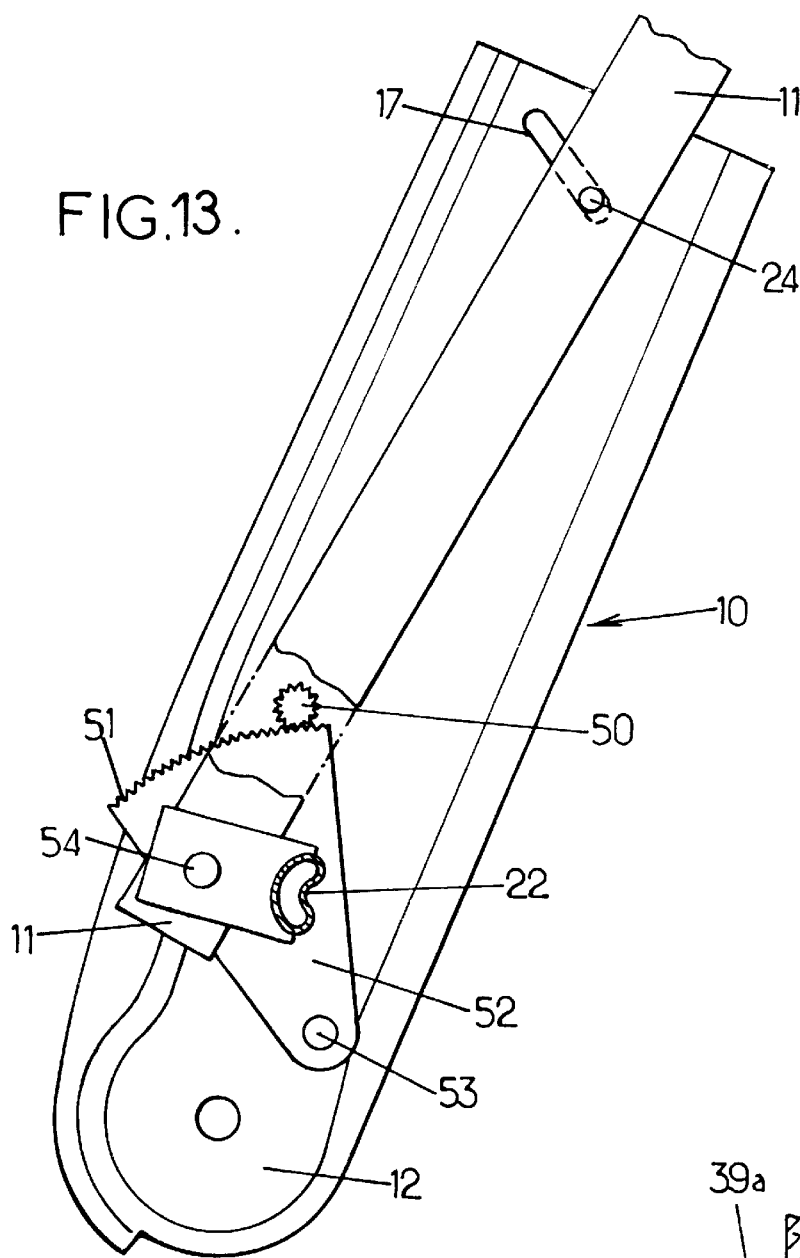
FIG. 13 is a fragmentary diagrammatic view of the seat-back strength-member belonging to the seat of FIG. 1, in a fourth embodiment of the invention.
Figure 14:
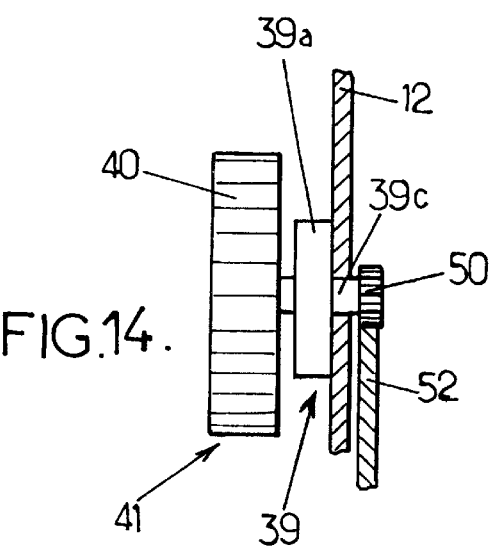
FIG. 14 is a detail view in section showing the control mechanism of the FIG. 13 strength-member.

In the fourth embodiment of the invention as shown in FIGS. 13 and 14, the side plates 12 of the lower portion of the seat-back strength-member still have upper slots 17 extending upwards and forwards and each of them still receives a pivot 24 secured to the top portion 11 of the seat-back strength-member.

As in the third embodiment, these upper slots 17 are smooth.

Furthermore, still like the third embodiment of the invention, the angular position of the upper portion 11 of the seat-back strength-member can be adjusted by means of a rotary knob 40 which drives a conventional non-reversible type of transmission 39. By way of example, the transmission 39 can be of the type disclosed in document DE-3 734 363, in document U.S. Pat. No. 5,593,210, in document FR-843 668, or indeed in document U.S. Pat. No. 1,529,248.

The housing 39a of this transmission is fixed to the side plate 12 while the inlet shaft 39b of said transmission is secured to the knob 40, with the outlet shaft 39c of the transmission being secured to a gearwheel 50 which meshes with a set of teeth 51 occupying a circular arc, and formed on one end of a link 52 whose other end is pivotally mounted on the side plate 12.

In addition, the link 52 is connected to the lower end of the upper portion 11 of the seat-back strength-member via a pivot 54 which preferably also secures the cross-member 22 to the said lower end of the upper portion 11 of the seat-back.

A link that is similar (but without teeth) is provided on the other side of the seat, there being a link bar extending between the two links to synchronize movement thereof.

The transmission 39 is adapted to prevent the gearwheel 50 from moving in the absence of actuation by the knob 40, providing a predetermined torque is not applied to said gearwheel 50.

In contrast, when a torque greater than said predetermined torque is applied to the gearwheel 50, then the transmission 39 allows the gearwheel 50 to revolve, while nevertheless braking its motion.

Thus, when the vehicle in which the seat is mounted is subjected to a violent impact from behind, the passenger's back urges the cross-member 22 rearwards, thereby generating torque at the gearwheel 50 that exceeds the above-mentioned predetermined torque, such that the lower end of the upper portion 11 of the seat-back strength-member moves upwards and rearwards with the link 52 while the top end of the upper portion 11 of the seat-back strength-member moves upwards and forwards, following the slot 17, with this movement being braked by the transmission 39 which absorbs a portion of the energy of said motion by friction.

Figure 15:
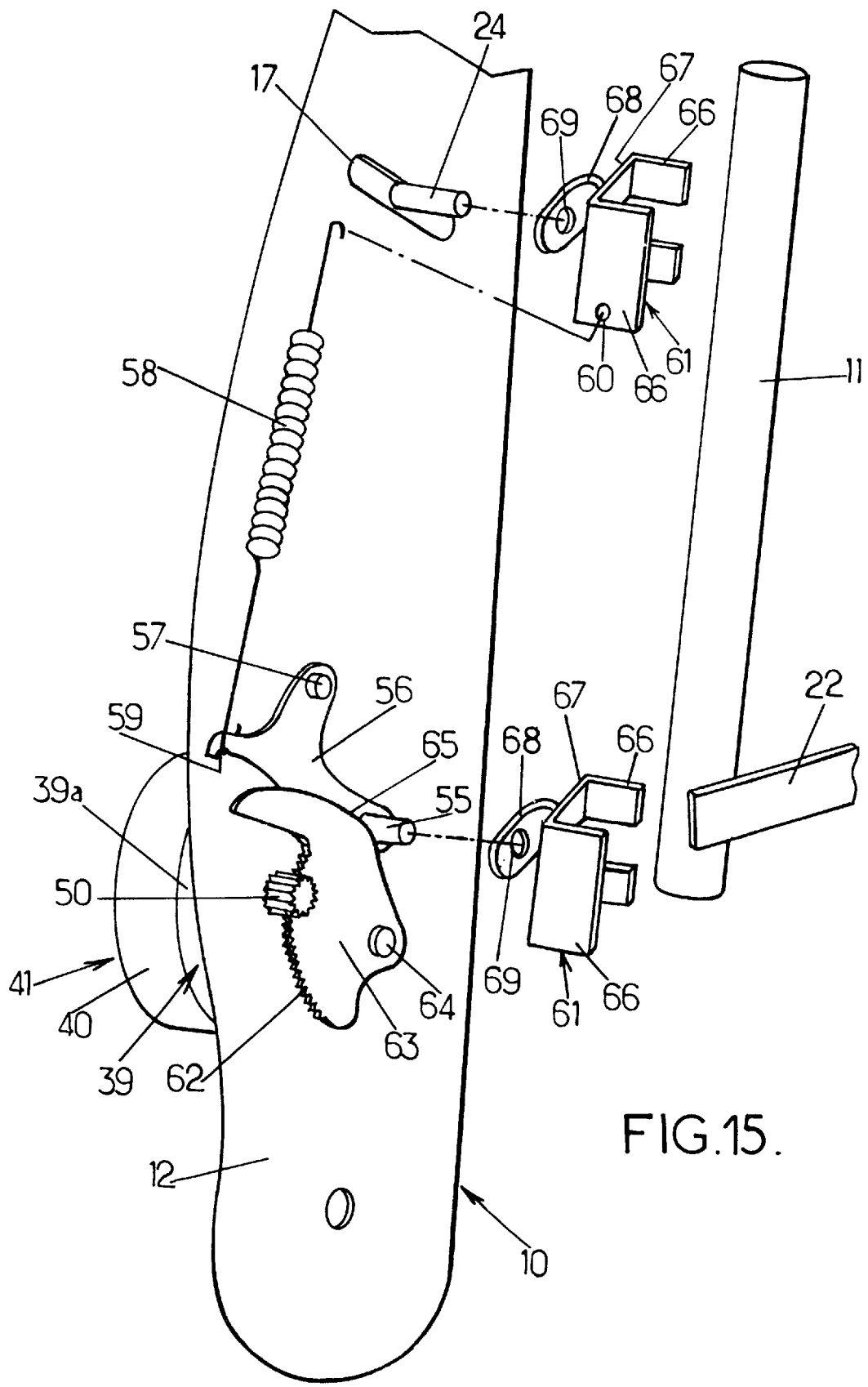
FIG. 15 is a fragmentary perspective view of the seat-back strength-member belonging to the FIG. 1 seat in a fifth embodiment of the invention.

In the fifth embodiment of the invention, as shown in FIG. 15, the upper portion of the seat-back strength-member is connected to each of the side plates 12 via:

an upper pivot 24 sliding in a sloping slot 17 extending upwards and forwards as in the fourth embodiment; and a pivot 55 secured to a rocker link 56 itself secured to the side plate 12 via a pivot 57.

The rocker link 56 is biased in its direction of rotation corresponding to moving the pivot 55 in a forwards direction by means of a spring 58, e.g. a traction spring having one end fixed to a hook 59 of the rocker link and having its other end fixed in a hole 60 of an intermediate metal part 61 secured to the upper portion 11 of the seat-back.

The angular position of the link 56, and thus the angular position of the upper strength-member 11 of the seat-back is adjusted by means of an adjustment mechanism 41 including a knob 40, a non-reversible transmission 39, and a gearwheel 50 that are identical or similar to those described above with reference to FIGS. 13 and 14.

The gearwheel 50 meshes with a circular set of teeth 62 on a cam 63 that is pivotally mounted on the side plate 12 about a pivot 64, said cam 63 having a bearing edge 65 facing rearwards, and in contact with the pivot 55 of the link 56 in the vicinity of the lower end of the upper portion 11 of the seat-back strength-member.

In normal use of the vehicle seat, the spring 58 is strong enough to hold the pivot 55 in abutment against the abutment edge 65 of the cam 63.

In contrast, when the vehicle is subjected to an impact from behind due to a traffic accident, the user's pelvis bears against the cross-member 22 of the upper portion 11 of the seat-back causing the link 56 to pivot rearwards against resilient urging from the spring 58, while the pivot 24 moves forwards and upwards in the corresponding slot 17.

During this movement, a portion of the energy of the impact is absorbed by the spring 58.

Advantageously, the energy of the impact is also absorbed at the end of the movement of the upper portion 11 of the seat-back strength-member, by the above-mentioned intermediate parts 61 which are welded to the upper portion 11 of the seat-back strength-member in the vicinity of the pivots 24 and 55, on opposite sides of the seat-back.

By way of example, the intermediate parts may be channel-section members having flanges 66 extending towards the upper portion 11 of the seat-back strength-member and webs 67 each including a tab 68 cut out from the sheet metal 61.

Each tab 68 is preferably folded through 180° so as to extend substantially horizontally forwards parallel to the side plate 12.

In addition, each tab 68 has a hole 69 or some other fixing means suitable for fixing to the corresponding pivot 24 or 55.

In this way, after the vehicle has been subjected to an impact from behind, the intermediate parts 61 initially withstand the impact while the upper portion 11 of the seat-back strength-member moves into its second angular position. Thereafter, once the pivots 24 and 55 have reached their abutment positions, the tabs 28 have the sheet metal of the webs 67 of the channel-section members constituting the intermediate parts 61, thereby serving to absorb an additional portion of the energy of the impact.

In the embodiment shown in FIG. 15, it will also be observed that, where appropriate, the gearwheel 50 could be driven by a control mechanism that is completely non-reversible, and in particular one actuated by an electric motor.

Also, in all of the embodiments, the upper slots 17 and the associated pivots 24 could be replaced by link-ages.

We claim:

1. A vehicle seat comprising a seat-back surmounted by a headrest and provided with a strength-member supporting padding, said seat-back having a front face designed to bear against the back of a passenger, the strength-member of the seat-back being made up of two portions that are movable one relative to the other, namely firstly a lower portion and secondly an upper portion carrying the head-rest, said upper portion being pivotally mounted on the lower portion to pivot about an axis of rotation between first and second angular positions in which it is respectively inclined as far rearwards and as far forwards as it will go relative to the lower portion, the front face of the seat-back itself having two superposed regions, namely a lower region and an upper region which are secured respectively to the lower portion and to the upper portion of the seat-back strength-member, the upper portion of the seat-back strength-member having a thrust member located in the seat-back below the axis of rotation of said upper portion so that in the event of the vehicle being subjected to an impact from behind, the upper portion of the seat-back strength-member is urged towards the second angular position, the upper and lower portions of the seat-back strength-member being interconnected via a retaining device which normally prevents involuntary pivoting of the upper portion, said retaining device having a mechanical resistance which is chosen so that the retaining device gives way when the upper portion of the seat-back is in a position other than the second angular position and said thrust member is subjected to a rearwardly-directed force in excess of a predetermined value, in the event of an impact from behind, and the headrest is mounted on the upper portion of the seat-back so as to be subjected to the same movement as said upper portion in the event of an impact from behind;

wherein said seat further includes energy absorption means for braking the upper portion of the seat-back strength-member throughout angular movement thereof, while said upper portion is moving into the second angular position, in the event of an impact from behind; and wherein the retaining device is a non-reversible control mechanism driven by a control member, said control mechanism being adapted to move the upper portion of the seat-back strength-member between the first and second angular positions as a function of actuation of the control mechanism, and to lock said upper portion of the seat-back strength-member when the control mechanism is unactuated.

2. A seat according to claim 1, in which the upper portion of the seat-back strength-member is mounted on the lower portion to move upwards at the same time as the seat-back strength-member pivots forward.

3. A seat according to claim 1, in which the upper portion of the seat-back strength is in the form of a frame including a horizontal lower cross-member constituting said thrust member.

4. A seat according to claim 1, in which the locking device comprises the energy absorption means.

5. A seat according to claim 1, in which the locking device holds the upper portion of the seat-back strength-member in the first angular position relative to the lower portion of said strength-member in the absence of an impact from behind.

6. A seat according to claim 5, in which the upper portion of the seat-back strength-member is pivotally mounted on the lower portion of said strength-member by means of pivots sliding in slideways, at least one of said slideways extending longitudinally between first and second ends of a shape that is adapted normally to hold the corresponding pivot at a first end thereof and in the event of an impact from behind to deform to allow said pivot to move from the first end to the second end of the slideway while the slideway is being subjected to progressive plastic deformation throughout the movement of the pivot between the first and second ends of the slideway.

7. A seat according to claim 6, in which the slideway is formed by a slot having an enlarged portion at the first end thereof and a narrower portion extending from said enlarged portion to the second end of said slideway, said narrower portion being adapted to deform plastically while allowing the corresponding pivot to be displaced in the event of an impact from behind.

8. A seat according to claim 1, in which the control mechanism comprises at least one rotary drive member meshing with a set of teeth, one of said drive member and said set of teeth being connected to the upper portion of the seat-back strength-member, and the other one thereof being connected to the lower portion of said strength-member so that displacement of the drive member against the set of teeth causes an inclination of the upper portion of the seat-back strength-member to be varied, the set of teeth being adapted to deform progressively and plastically to enable the drive member to move along said set of teeth without rotating in the event of an impact from behind, said set of teeth thus constituting the energy absorption means.

9. A seat according to claim 1, in which the upper portion of the seat-back strength-member is pivotally mounted on the lower portion of said strength-member via pivots slidably received in corresponding slideways, at least one of the pivots including said drive member, and said set of teeth being formed in the corresponding slideway.

10. A seat according to claim 1, in which the upper portion of the seat-back strength-member is pivotally mounted on the lower portion of said strength-member by means of pivots slidably received in corresponding slideways, at least one of the pivots being secured to a link, one of said pivot and the corresponding slideway being secured to the upper portion of the seat-back strength-member, and the other one thereof being secured to the lower portion of said strength-member, the link being displaceable by means of said non-reversible control mechanism relative to the portion of the seat-back strength-member which includes said slideway so that displacement of the link entrains corresponding displacement of the pivots in the slideways and the link is plastically deformable in the event of an impact from behind, thereby constituting the energy absorption means.

11. A seat according to claim 10, in which the control mechanism comprises a gearwheel mounted to rotate on the seat-back strength-member portion which includes the slideway corresponding to the link, said gearwheel meshing with a rack formed in the link.

12. A seat according to claim 10, in which the link is in the form of a piece of sheet metal which is provided with a slot extending between first and second ends, said slot having en enlarged portion at the first end and a narrower portion extending from said enlarged portion to the second end of the slot, the pivot which is secured to the link being engaged with substantially no play in said enlarged portion, said slot being disposed substantially in correspondence with the slideway in which said pivot slides, at least when the upper portion of the seat-back strength-member is in the first angular position, and the slot is adapted to deform plastically and progressively while allowing said pivot to move towards the second end of the slot when the upper portion of the seat-back strength-member is moved towards the second angular position in the event of an impact from behind.

13. A seat according to claim 1, in which the non-reversible control mechanism is carried by the lower portion of the seat-back strength-member and drives a gearwheel which meshes with a toothed link pivotally mounted on the lower portion of the seat-back and hinged to the upper portion of the seat-back, the non-reversible control mechanism being adapted to allow the gearwheel to rotate while braking the gearwheel in the absence of action being taken on the control member, whenever said gearwheel is subjected to a rotary torque in excess of a predetermined value in the event of an impact from behind.

14. A seat according to claim 1, in which the non-reversible control mechanism entrains a gearwheel which is mounted on the lower portion of the seat-back strength-member and which entrains a toothed cam, the toothed cam being pivotally mounted on said lower portion, said cam having a bearing edge in contact with an element secured to the upper portion of the seat-back strength-member so as to allow displacement of said upper portion solely towards the second angular position, and said upper portion of the seat-back strength-member is urged resiliently towards the first angular position.

15. A seat according to claim 14, in which the element secured to the upper portion of the seat-back strength-member connects said upper portion to a link which is pivotally mounted on the lower portion of the seat-back strength-member.

16. A seat according to claim 1, in which the upper portion of the seat-back strength-member is connected to the lower portion of said strength-member by tearable pieces of metal sheet of a dimension suitable for withstanding the forces applied thereto while the upper portion of the seat-back strength-member is moving towards the second angular position in the event of an impact from behind, and thereafter to tear in part while continuing to absorb a fraction of the energy of the impact.

* * * * *